US005211754A

United States Patent [19]

Komuro

[11] Patent Number: 5,211,754

[45] Date of Patent: May 18, 1993

[54] METHOD OF MANUFACTURING A SUBSTRATE FOR A LIQUID JET RECORDING HEAD, SUBSTRATE MANUFACTURED BY THE METHOD, LIQUID JET RECORDING HEAD FORMED BY USE OF THE SUBSTRATE, AND LIQUID JET RECORDING APPARATUS HAVING THE HEAD

[75] Inventor: Hirokazu Komuro, Yokohama, Japan

[73] Assignee: Canon Kabushiki Kaisha, Tokyo, Japan

[21] Appl. No.: 788,501

[22] Filed: Nov. 6, 1991

Related U.S. Application Data

[60] Division of Ser. No. 742,740, Aug. 6, 1991, Pat. No. 5,140,345, which is a continuation of Ser. No. 487,395, Mar. 1, 1990, abandoned.

[30] Foreign Application Priority Data

Mar. 1, 1989 [JP] Japan .................................. 1-48838
Mar. 1, 1989 [JP] Japan .................................. 1-48839

[51] Int. Cl.[5] .......................................... G01D 15/16

[52] U.S. Cl. .................................. 118/300; 29/611; 29/890.1; 346/140 R

[58] Field of Search ........... 346/140 R; 29/611, 890.1; 118/300

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,536,250 | 8/1985 | Ikeda et al. | 156/651 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,777,494 | 10/1988 | Shibata et al. | 346/1.1 |

FOREIGN PATENT DOCUMENTS

| | | |
|---|---|---|
| 032087 | 7/1981 | European Pat. Off. . |
| 2843064 | 4/1979 | Fed. Rep. of Germany . |
| 54-56847 | 5/1979 | Japan . |
| 54-59936 | 5/1979 | Japan . |
| 59-123670 | 7/1984 | Japan . |
| 59-138461 | 8/1984 | Japan . |
| 60-71260 | 4/1985 | Japan . |
| 60-157872 | 8/1985 | Japan . |
| 62-204952 | 9/1987 | Japan . |

OTHER PUBLICATIONS

J. G. Eden, "Photochemical Processing of Semiconductors: New Applications for Visible and Ultraviolet Lasers", IEEE Circuits and Devices Magazine, vol. 2, No. 1, Jan. 1986, pp. 18-24.

*Primary Examiner*—W. Gary Jones
*Assistant Examiner*—Charles K. Friedman
*Attorney, Agent, or Firm*—Fitzpatrick, Cella, Harper & Scinto

[57] ABSTRACT

A method of manufacturing a substrate is disclosed for an ink jet recording head having an electro-thermal transducer disposed on a substrate supporting member and generating heat energy available to discharge ink, and a protective layer laminated so as to cover the electro-thermal transducer in order to protect the electro-thermal transducer from the ink. The method is characterized by the step of filling any pore created in the protective layer with a protective material. Also disclosed is a substrate for an ink jet recording head manufactured by such method, an ink jet recording head formed by the use of such substrate, and an ink jet recording apparatus having the head.

13 Claims, 10 Drawing Sheets

201A
201
201B
202
203
204
206
207
208
X
Y

METHOD OF MANUFACTURING A SUBSTRATE FOR A LIQUID JET RECORDING HEAD, SUBSTRATE MANUFACTURED BY THE METHOD, LIQUID JET RECORDING HEAD FORMED BY USE OF THE SUBSTRATE, AND LIQUID JET RECORDING APPARATUS HAVING THE HEAD

This application is a division of application Ser. No. 07/742,740 filed Aug. 6, 1991, now U.S. Pat. No. 5,140,343 which is a continuation of application Ser. No. 07/487,395 filed Mar. 1, 1990, now abandoned.

BACKGROUND OF THE INVENTION

1. Field of the Invention

This invention, as a typical manner of recording, relates to a method of manufacturing a substrate used as a constitutional member for a liquid jet recording head which causes a condition change including the production of bubbles in liquid by heat energy, discharges the liquid from a discharge opening by the condition change to thereby form flying droplets, and causes the flying droplets to adhere to a recording surface to thereby accomplish recording of information such as characters and images. The invention also relates to substrate manufactured by the method, a liquid jet recording head formed by use of the substrate, and a liquid jet recording apparatus having the head.

2. Related Background Art

The non-impact recording methods have recently drawn increasing attention because the production of noise during recording is negligibly small. Among those methods, the so-called ink jet recording method (the liquid jet recording method) which is capable of high-speed recording and moreover can effect recording on plain paper without requiring the special process of fixation is a very promising recording method. Various systems using the ink jet recording method have heretofore been proposed and apparatuses which embody these systems have been desired, and some of them have been improved and commercialized and some are still under the process of being put into practical use.

Among them, the liquid jet recording methods described, for example, in Japanese Laid-Open Patent Application No. 54-59936 (corresponding U.S. Pat. Nos. 4,723,129, 4,740,796) and German Laid-Open Patent Application (DOLS) No. 2843064 have a feature differing from that of the other liquid jet recording methods in that heat energy which is energy to be used for discharging liquid is caused to act on liquid to thereby obtain a motive force for liquid droplet discharge.

That is, in the typical example of recording methods disclosed in the above-mentioned publications, liquid subjected to the action of the heat energy causes a condition change involving a steep increase in volume, and by an action of force based on the condition change, liquid is discharged as a droplet from a discharge opening (hereinafter referred to as the orifice), for example, provided at the fore end of a recording head unit and flies and adheres to a recording medium, whereby recording of information is accomplished The liquid jet recording method disclosed above can not only be very effectively applied to the so-called drop-on demand recording method, but also can be easily realized by providing the recording head unit with highly dense multiple orifices over the full line width thereof corresponding to the recording region of the recorded member and therefore, has an advantage that images of high resolution and high quality can be obtained at a high speed.

An embodiment of the recording head of an apparatus applied to the above-described recording system is provided with a liquid discharge portion having an orifice provided to discharge ink as droplet therethrough and an ink liquid path provided with a heat-acting portion as a portion communicating with the orifice and causing heat energy to be used for discharging ink to act on the ink, and an electrothermal transducer provided corresponding to the heat-acting portion as means for generating the heat energy.

A typical example of this electro-thermal transducer comprises a pair of electrodes, and a heat generating resistance layer connected to these electrodes and a heat generating region (a heat generating portion) being constituted at a position corresponding to the portion between the electrodes. The heat generating resistance layer and electrodes are generally formed in the surface portion of the base plate of the ink jet recording head as a layer. An example of the prior-art construction of the base plate in which such an electro-thermal transducer is formed is shown in FIGS. 1A and 1B of the accompanying drawings The example of the prior art will hereinafter be described with reference to these figures.

FIG. 1A is a fragmentary plan view showing the vicinity of an electro-thermal transducer in a substrate (hereinafter also referred to as the base plate) constituting an ink jet recording head, and FIG. 1B is a fragmentary cross-sectional view of a portion indicated by dot-and-dash line XY in FIG. 1A.

In these figures, the base plate 101 is formed by a lower layer 106, a heat generating resistance layer 107, electrodes 103, 104, a first upper protective layer 108, a second upper protective layer 109 and a third upper protective layer 110 successively laminated on a supporting member 105.

The heat generating resistance layer 107 and electrodes 103 and 104 are patterned into a predetermined shape by etching. That is, in the other portions than the portion being constituted the heat generating region 102, they are patterned almost into one and the same shape, and in the portion, being constituted the heat generating region 102, the electrodes are not laminated on the heat generating resistance layer 107, but the heat generating resistance layer 107 constitutes a heat generating portion 111. The first upper protective layer 108 and the third upper protective layer 110 are laminated over the whole surface of the base plate 101, while the second upper protective layer 109 is patterned so as not to be laminated on the heat generating region 102.

The material to be used for forming each layer provided in the surface portion of the base plate formed as described above is suitably chosen based on characteristics such as heat-resisting property, liquid-resisting property, heat conductivity and insulativeness required corresponding to respective portion of layers The main function of the first upper protective layer 108 in the above-described example of the prior art is to insulate the common electrode 103 from the selected electrode 104, the main function of the second upper protective layer 109 is to prevent the permeation of liquid and resist the liquid, and the main function of the third upper protective layer 110 is to reinforce the liquidresisting property and mechanical strength.

Now, of the first and third protective layers 108 and 110 lying on the upper layer of the heat generating region (hereinafter also referred to as heater portion for discharging) 102, the third protective layer 110 is in contact with ink, and with regard to the defects of the film forming these layers, care must be particularly taken of insulativeness or the like. Pin-holes and dust in the film may be mentioned as the defects of the film, and with regard to pin-holes, for example, as shown in JP Laid-Open Patent Application No. 60-157872 (corresponding U.S. Pat. No. 4,777,494), could be dissolved by anode-oxidizing the ground of the film portion, but the entry of dust into the film could not be sufficiently dissolved.

That is, in the ink jet system in which heat is caused to act, the first and third protective layers 108 and 110 need to be formed thin (for example, 3 μm at greatest) in view of efficiency of heat conductivity and accordingly, as the forming method therefor the vacuum accumulation method has been preferred. The vacuum accumulation method, because of its system, cannot prevent the entry of dust into the film with an acceptable reliability. This is because, for example, when a vacuum container is subject to vacuum, especially after film formation, part of the film which has peeled from the wall of the vacuum container adheres to the base plate and becomes dust in the film.

In the case of a base plate on which about twenty-four heater portions for discharging are formed, the probability with which the base plate becomes unsatisfactory due to the entry of dust is not extremely high and therefore, there will be little problem if base plate entered dust is dealt with as unsatisfactory. However in the case of, for example, a base plate on which one thousand or more heater portions for discharging are formed, the entry of dust into a base plate may become great and therefore many problems arise. In either case, due to the entry of dust in the film, durability of the head itself may become bad. That is, if dust is present in the film, the dust will separate from within the film due to the action of force during the formation of a bubble for discharging ink and it will develop a pin-hole. The ink may penetrate into such pin-hole and come into contact with the heater portion for discharging and react therewith, whereby the heater portion for discharging may be disconnected.

Thus, the presence of defects in the protective layers of the heat generating portion due to the entry of dust into the film, reduces the durability of the head remarkably. Again, in such a case, if the base plate is one on which for example, about twenty-four heater portions for discharging are formed, the probability with which the base plate becomes unsatisfactory is low and therefore, it will pose no problem in terms of yield to regard base plate entered dust as being unsatisfactory, but in the case of, for example, a base plate on which one thousand or more heater portions for discharging are formed, the probability of heater portions for discharging which suffer from the entry of dust into a base plate will become great and if all these are regarded as being unsatisfactory, it will cause a reduction in yield.

On the other hand, when in the liquid jet recording head as described above, short-circuiting has occurred between wirings during the manufacturing process, the short-circuited wiring portion has been cut by the use of a laser beam to thereby separate the wirings from each other, but when a laser beam is thus used, as shown in FIGS. 2A-1 and 2B-1 of the accompanying drawings, a damage has been imparted to the heat generating resistance layer 202 on the support member 201 of the substrate for recording head to form a large hole (recess) 206. Then, in order to protect the wirings from recording liquid (ink), an upper protective layer 204 is formed near the wirings 203 by a film making method such as the sputtering method, but in the location of this large hole 206, the wiring 203 could not be sufficiently covered with the upper protective layer 204.

Therefore, as indicated by arrow K in FIG. 2B-2 of the accompanying drawings, during the use, the ink will sometimes permeate into the portion in which the hole 206 has been formed to thereby corrode the electrodes 203. This has sometimes led to the disconnection of the wirings. The reference numeral 205 designates that portion of the electrode which has been corroded by the ink.

So, an attempt has been made to further provide a second upper protective layer on the protective layer 204, but in the case of such a large hole 206 (usually having a depth of 1 μm or more), bubbles have collected there or have been repelled by the protective film, and it has been the case that the wirings cannot be covered well even with the second upper protective layer. Also, aluminum has heretofore been generally used as the material for the wirings, and in order to prevent the above-described corrosion, attempts have been made to find electrically conductive materials other than aluminum, but there has not been yet found an anticorrosive conductive materials optimum in respect of manufacturing cost, workability and resistivity characteristic.

Thus, heretofore, it has happened that the ink permeates from the portion in which the wirings have been cut by a laser beam and the wirings are corroded and thereby disconnected, and this has sometimes reduced the reliability of the recording head.

SUMMARY OF THE INVENTION

The present invention has been made in view of the above-noted problems and an object thereof is to provide a method of manufacturing a substrate for an ink jet recording head in which pores created in the protective layer of an electro-thermal transducer generating heat energy to be used for discharging ink are filled with another protective material, whereby the durability of the recording head can be increased and the yield of manufacture thereof can be improved, a substrate manufactured by the method, a liquid jet recording head formed using the substrate, and a liquid jet recording apparatus having the head.

Another object of the present invention is to eliminate the problems as noted above and to provide a method of manufacturing a substrate for a liquid jet recording head which is free of the possibility of recording liquid permeating into a recess created by the short-circuited wiring portion of electrodes being cut to thereby corrode the wiring and which is high in reliability, a substrate manufactured by the method, a liquid jet recording head using the substrate, and a liquid jet recording apparatus having the head.

Still another object of the present invention is to provide a method of manufacturing a substrate for an ink jet recording head having an electrothermal transducer disposed on a supporting member and generating heat energy available to discharge ink, and a protective layer laminated over the electrothermal transducer to protect the electro-thermal transducer from the ink, characterized by the step of filling pores created in the protective layer with a protective material.

According to the above-described construction, the insulation between the ink and the electro-thermal transducer is accomplished reliably.

Yet still another object of the present invention is to provide a method of manufacturing a substrate for a liquid jet recording head provided with a support member and an electro-thermal transducer provided on the support member and having a heat generating resistance layer and electrodes connected to the heat generating resistance layer, characterized by the steps of cutting the short-circuited wiring portion of the electrodes, embedding a filler into a recess created in the support member by the cutting, and providing a protective layer on the embedded filler and the electrodes.

In the present invention, a filler is embedded into a recess created in the support member by cutting the short-circuited wiring portion of the electrodes by a laser beam or the like, whereby the great level difference of the recess is eliminated, and a protective layer is provided on the embedded filler and the electrodes so that the covering property of the protective layer may be improved and therefore, the permeation of recording liquid into the electrodes can be eliminated to thereby prevent the corrosion of the electrodes. Also, an insulating material is used as the embedded filler, whereby the reliability of the recording head during the long-term use thereof in the recording liquid can be improved.

BRIEF DESCRIPTION OF THE DRAWINGS

FIGS. 11A-1, 11A-2, 11A-3, 11A-4 and 11B-1, 11B-2, 11B-3, 11B-4 are plan views and cross-sectional views, respectively, showing the steps of an embodiment of the present invention.

DESCRIPTION OF THE PREFERRED EMBODIMENTS

Some embodiments of the present invention will hereinafter be described in detail with reference to the drawings.

EXAMPLE 1

Figure 1A:
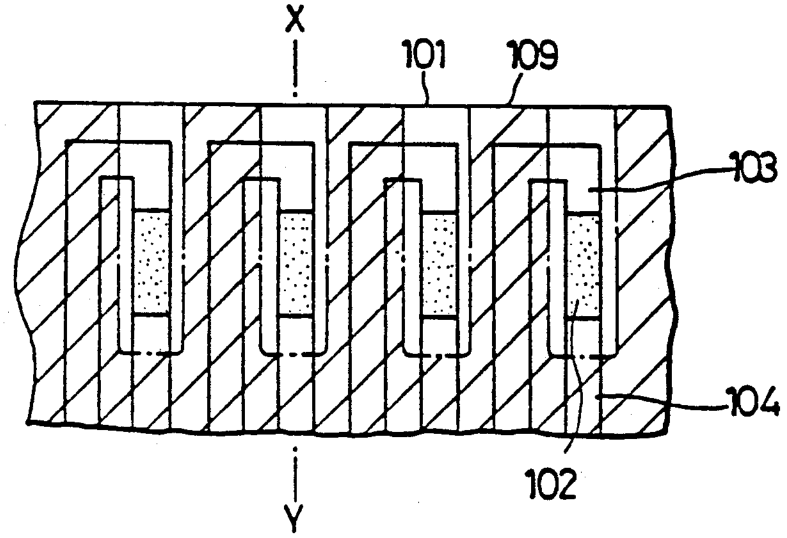
FIG. 1A PRIOR ART
FIGS. 1A and 1B are a top plan view and a cross-sectional view, respectively, showing an embodiment of the construction of a base plate for an ink jet head.
Figure 1B:
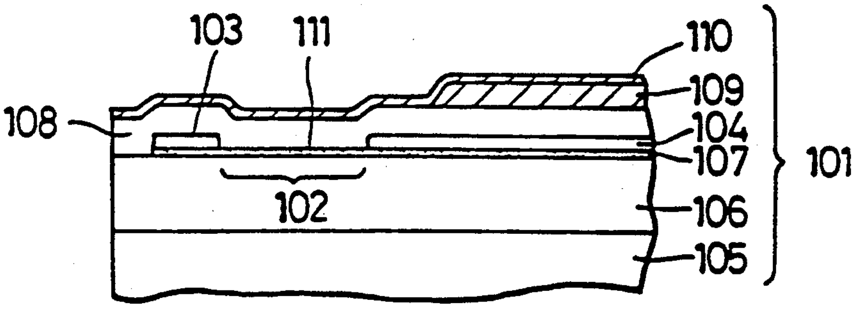
FIG. 1B PRIOR ART
Figure 3A:
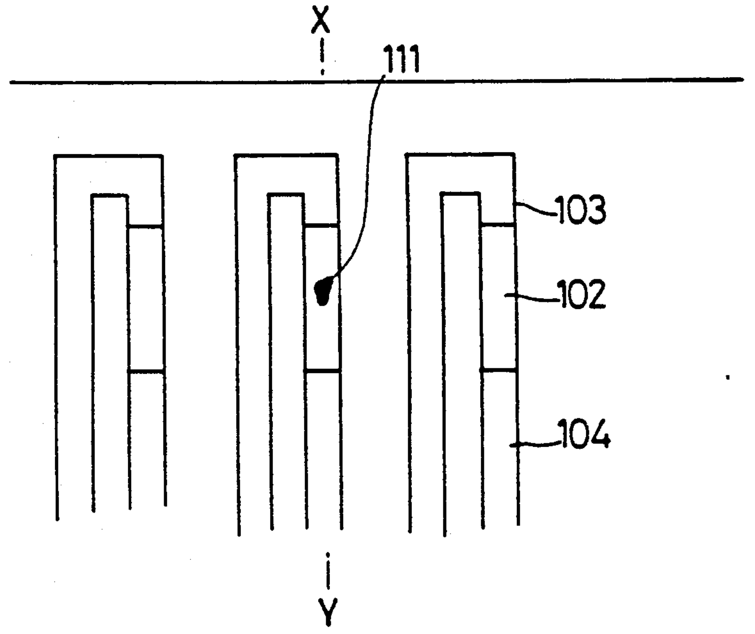
FIGS. 3A and 3B are a top plan view of a base plate according to an embodiment of the present invention and a cross-sectional view, respectively, taken along line X-Y in the plan view.
Figure 3B:
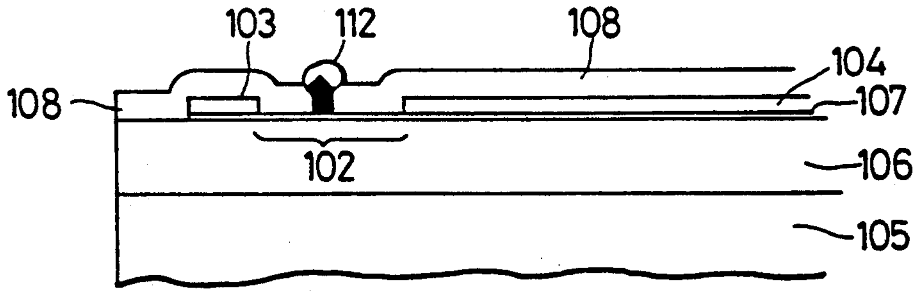

FIGS. 3A and 3B are a top plan view and a side cross-sectional view, respectively, of a base plate (also called a substrate) for a recording head according to an embodiment of the present invention. In these figures, feature elements similar to those shown in FIGS. 1A and 1B are given similar reference numerals and need not be described. In FIGS. 3A and 3B, on a lower layer comprising $SiO_2$ on which a supporting member 105 comprising Si is formed, a heat generating resistance member, a layer comprising $HfB_2$ and Al conductive layer to form electrode are formed by the use of the vacuum thin film making technique Subsequently, the patterns of a heat generating resistance member 102 and electrodes 103 and 104 are formed by the photolithography technique. Further, a first protective layer 108 formed of $SiO_2$ is formed with a thickness of 0.5 μm by sputtering.

After the first protective layer 108 has been formed, the base plate is inspected by means of an optical microscope, and the base plate having a defect 112 in the protective layer 108 for the heat generating resistance member 102 is extracted. This extracted base plate is then placed into a powerful ultrasonic wave tank, and dust (foreign substance) in the defect 112 is removed. The result is shown in FIG. 4, wherein the reference character 112A designates the pore from which the foreign substance has been removed.

Figure 5:
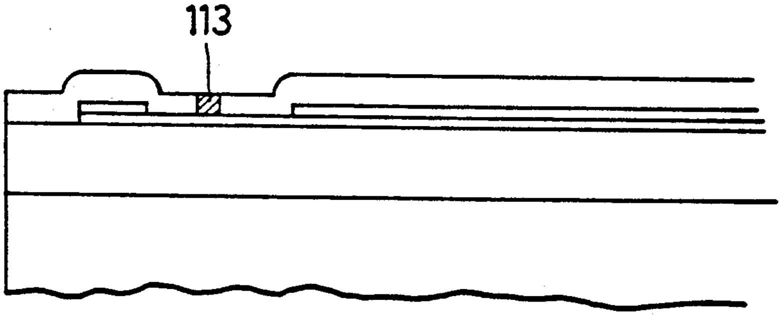
Figure 6:
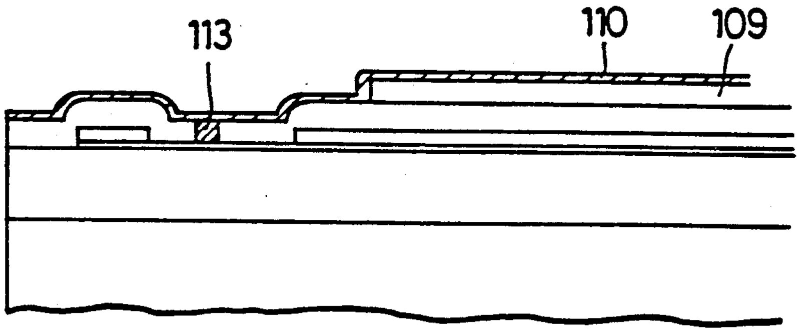

Then, in order to fill a filler in this pore, the base plate is placed into a vacuum chamber and silane ($SiH_4$) and $NO_2$ are poured thereinto to provide an atmosphere of 1 Torr. Subsequently, a laser beam is applied to the pore 112A, and in this portion, silane ($SiH_4$) and $NO_2$ are caused to react to each other. As a result, as shown in FIG. 5, a filler 113 comprising $SiO_2$ is accumulated in the pore 112A. The amount of $SiO_2$ accumulated in the pore is adjusted by adjusting the application time of the laser beam. When the filling of the pore is completed, upper protective layers 109 and 110 are formed as shown in FIG. 6, whereupon the manufacturing process for the base plate is completed.

As another example of filling the pore, there is a method as shown below.

Figure 4:
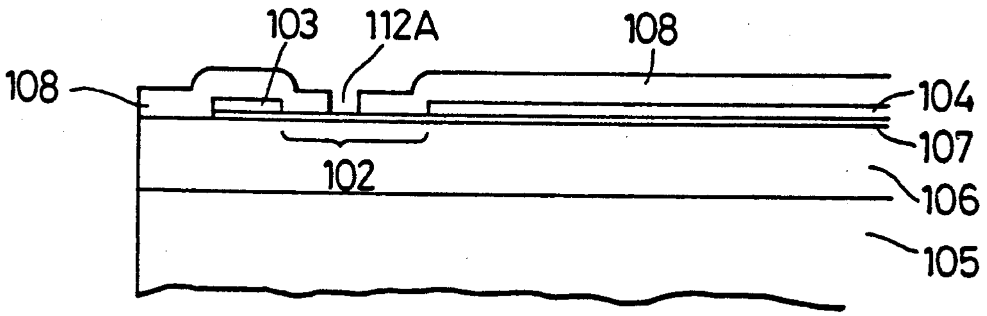
FIGS. 4 to 6 are cross-sectional views showing an embodiment of the present invention and illustrating the process of filling a pore.
Figure 7:
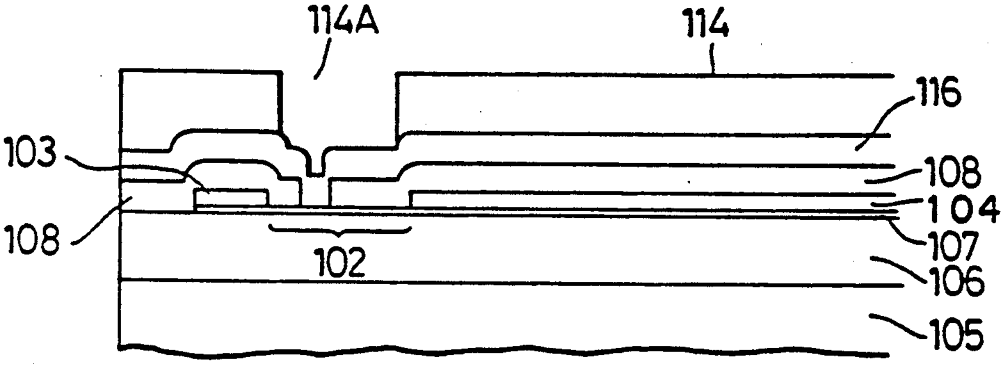
FIGS. 7 to 10 are cross-sectional views showing another embodiment of the present invention and illustrating the process of filling a pore.
Figure 8:
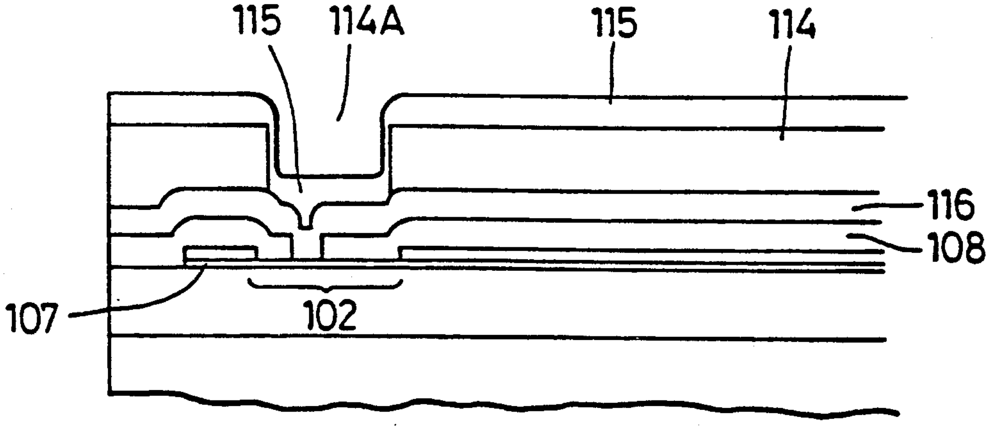

As shown in FIG. 7, $SiO_2$ layer 116 is formed into film having a thickness of 0.5 μm on the base plate as shown in FIG. 4 by sputtering. Resist 114 (OFPR 800; trade name, manufactured by TOK Co., Ltd.) is then applied with a thickness of 4 μm by spin coat. A pattern having a window 114A formed corresponding to the pore is formed by the photolithography technique. Further, resist 115 (OFPR 800; trade name, manufactured by TOK Co., Ltd.) is applied with a thickness of 1 μm by spin coat. The thickness of the resist 115 applied later is smaller in thickness of than the resist 114 applied earlier and therefore is not flattened, but assumes a shape as shown in FIG. 8.

Figure 9:
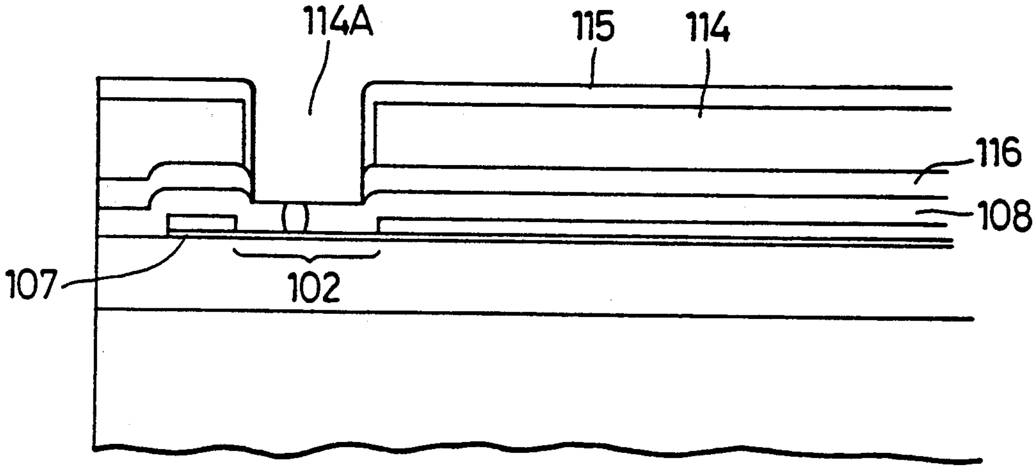
Figure 10:
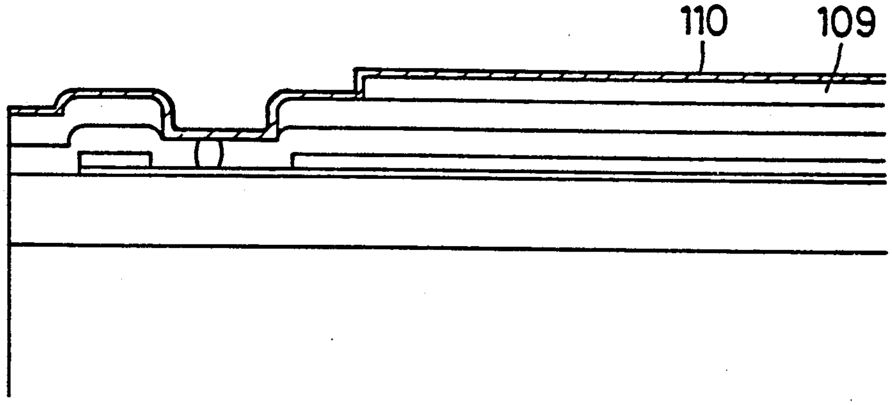

Thereafter, $CF_4$ and $H_2$ are poured at a ratio of 1 : 1 by the use of a reactive ion etching apparatus, and etching is effected at a power of 400 W. At this time, the etching speed of the resist is 500 Å/min. and that of $SiO_2$ is 500 Å/min and therefore, the resist and $SiO_2$ are etched at an equal speed. By this etching, that portion of the heat generating resistance member to which the resist has been applied is such that the thickness of $SiO_2$ 116 is 0.5 μm, whereas the thickness of the resist 115 is 1 μm and therefore, the surface formed by etching becomes flat and accordingly, the resist is etched while keeping its original shape. At a point of time whereat the resist is no longer etched in said portion of the heat generating resistance member 102, etching is terminated. As a result, the shape of the base plate becomes such as shown in FIG. 9. Subsequently, the resists 114 and 115 are peeled off, and a second protective layer 109 formed of organic polyimide is formed as a protective layer for electrodes 103 and 104. Finally, Ta is formed into film as a third protective layer 110 by sputtering, to thereby provide such a shape as shown in FIG. 10.

Figure 12:
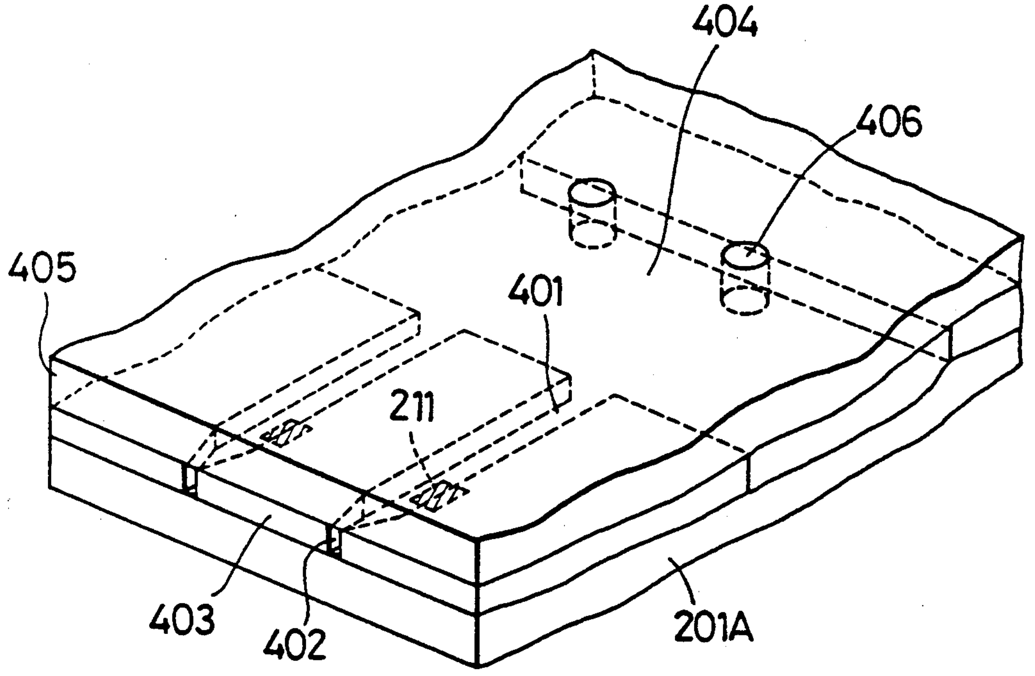
FIG. 12 is a fragmentary perspective view of a recording head according to an embodiment of the present invention.

The result of the discharge durability test of a recording head having the shape as shown in FIG. 12 made by the use of the substrate formed in the manner described above will be shown below.

As a comparative example, use was made of a recording head constructed of a base plate having a defect of about 3 μm diameter. Also, as the applied pulse, use was made of a rectangular pulse having a frequency of 2 kHz and a pulse width of 10 μs, and the applied voltage was 1.2 times as great as the voltage value for ordinary discharge.

As a result, in the above mentioned two examples, the life of the recording head with the filled pore was more than 5 times that of the comparative example.

As is apparent from the foregoing description, according to the present invention, the insulation between the ink and the electro-thermal transducer is reliably ensured.

As a result, it becomes difficult for the disconnection or the like of the electro-thermal transducer to occur with the use of the recording head, and the durability of the recording head is extremely improved.

Also, the defects of the base plate can be reduced and the yield is improved with a result that the manufacturing cost of the recording head can be reduced.

EXAMPLE 2

Figures 1, 2A:
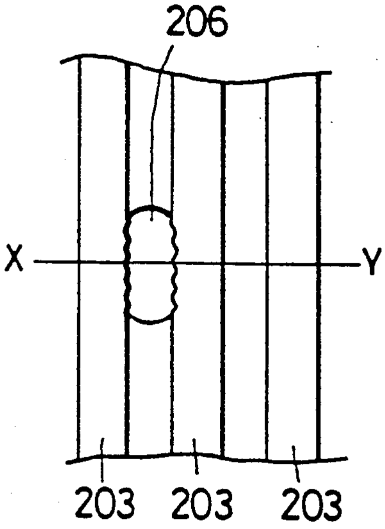
FIGS. 2A-1, 2A-2 and 2B-1, 2B-2 are perspective views showing main portion of an embodiment of ink jet apparatus of the present invention.
Figures 1, 2, 3, 4, 11A, 11B:
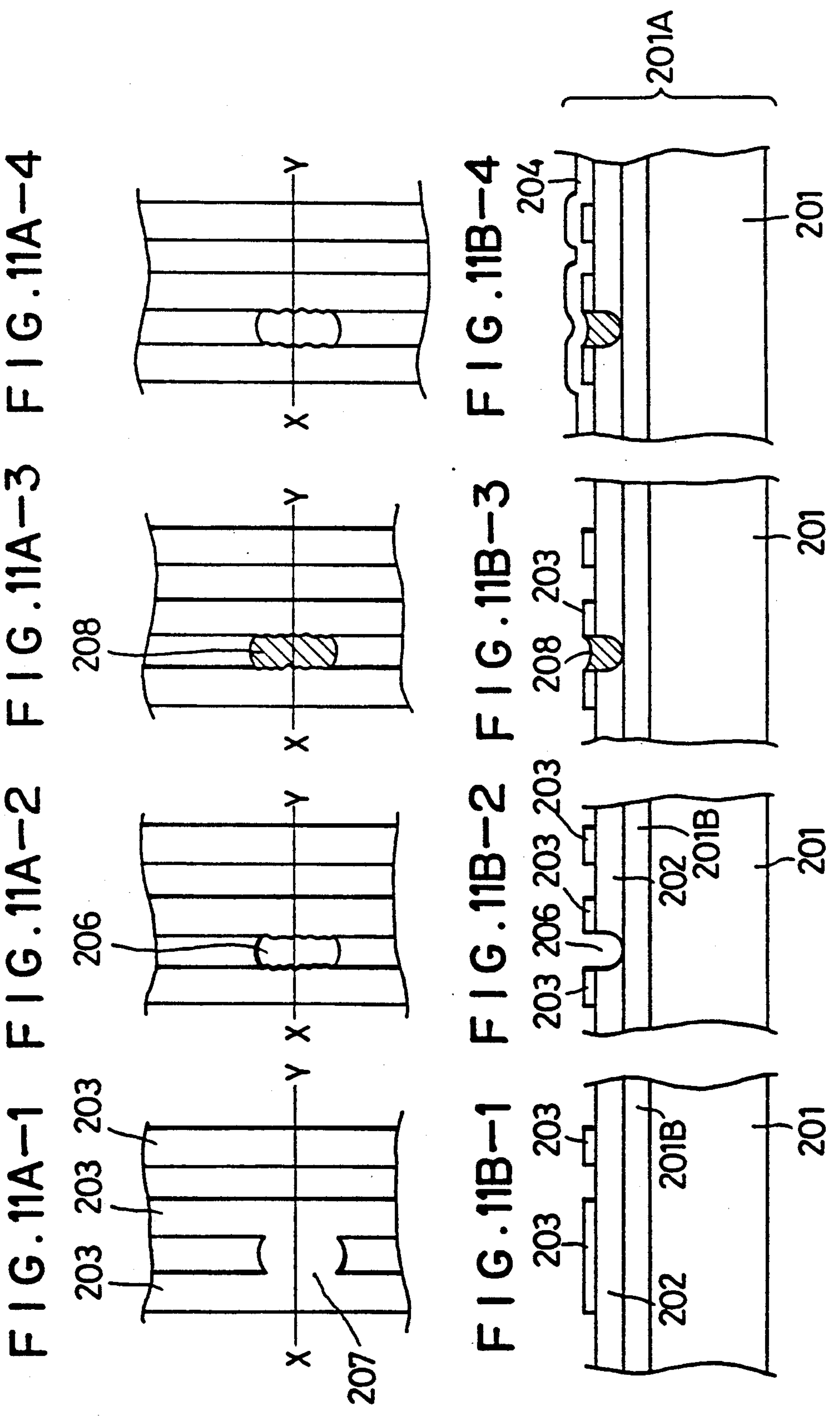

FIGS. 11A-1 to 11A-4 and 11B-1 to 11B-4 show the steps of an embodiment of the present invention, and FIGS. 11A-1 to 11A-4 are plan views showing the course of the steps, and FIGS. 11B-1 to 11B-4 are corresponding cross-sectional views along line X - Y in FIGS. 11A-1 to 11A-4 which show the course of the steps. The reference numeral 201 designates a support member for a substrate (also called a base plate) 201A for a recording head, the reference numeral 201B denotes a lower layer formed on the support member, the reference numeral 202 denotes a heat generating resistance layer provided on the lower layer 201B, the reference numeral 203 designates lead-out electrodes of aluminum connected to the heat generating resistance layer 202, the reference numeral 204 denotes an upper protective layer formed of $SiO_2$ and provided on the heat generating resistance layer 202 and the electrodes 203, the reference numeral 206 designates a hole (a recess) created in the support member 201 by the cutting by a laser beam, the reference numeral 207 denotes a short-circuited wiring portion, and the reference numeral 208 designates a filler formed of an insulating material such as $SiO_2$ embedded in the hole 206. The electro-thermal transducer has at least the heat generating resistance layer 202 and the electrodes 203.

First, when manufacturing a recording head, the heat generating resistance layer 202 formed of $HfB_2$ is laminated on the lower layer 201B formed of heat-oxidized $SiO_2$ on the Si (silicon) support member 201, and the electrodes 203 of aluminum are deposited thereon by evaporation with a thickness of 5000 Å and are subjected to patterning and wiring. In this process, in FIG. 11A-1, the portion 207 is short-circuited.

Figures 2, 2A:
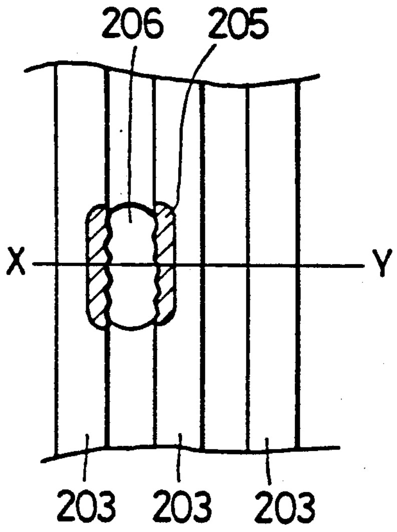
Figures 1, 2B:
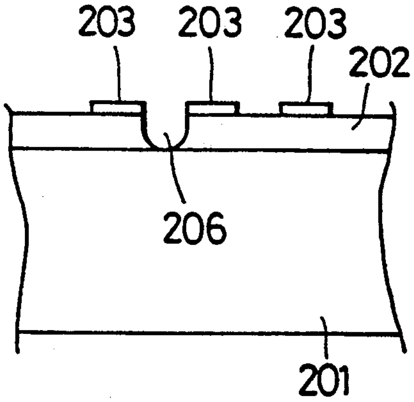
Figures 2, 2B:
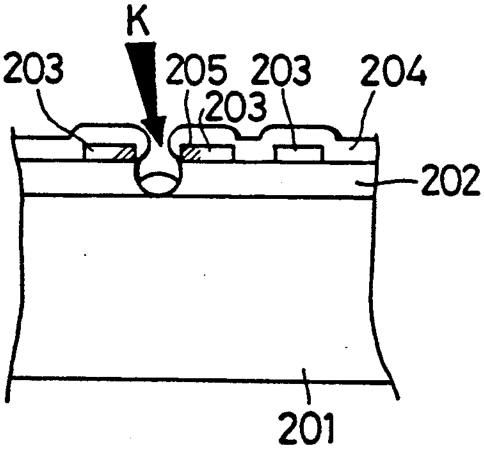

Subsequently, this short-circuited wiring portion 207 is cut by a laser beam. When the shortcircuited wiring portion 207 was actually subject three times by a laser beam having a wavelength of 1.06 μm, a beam intensity of 20 mJ/pulse and a pulse width of 20 nS. the short-circuited wiring portion 207 could be cut. FIG. 11A-2 shows the state of that portion after being cut, and it is seen that as shown in FIG. 11B-2, a hole 206 is formed on the support member 201 at the cut portion thereof.

Subsequently, the insulating material 208 as a filler is embedded into this hole 206. It is to be understood that the depth of the hole 206 is 2 μm. Therefore, the substrate 201–204 is placed into a vacuum chamber, not shown, and a mixture gas of silane ($SiH_4$) and nitrogen dioxide ($NO_2$) is caused to flow into the chamber to thereby provide an atmosphere of 1 Torr. When a laser beam is applied to the hole 206, $SiH_4$ (silane) and $NO_2$ react to each other in this hole 206, whereby $SiO_2$ 208 is accumulated therein. At that time, the application time of the laser beam is determined so that the hole 206 may be filled. The state in which the hole 206 has been filled with the insulating material 208 which is $SiO_2$ by such laser CVD (vapor phase growing method) is shown in FIG. 11A-3. As shown in this figure, particularly the filler 208 which is the insulating material is formed with said application time adjusted so that there may hardly be provided a level difference with respect to the height of the electrodes 203 of the wiring.

Subsequently, the layer 204 of $SiO_2$ as an upper protective layer is formed with a thickness of 1 μm on the filler 208 and the electrodes 203 by the sputtering method. As shown in FIGS. 11A-4 and 11B-4, the protective layer 204 of $SiO_2$ sufficiently covers the hole 206 formed by cutting the short-circuited wiring portion of the electrodes 203 by the laser beam and the lead-out electrodes 203.

FIG. 12 shows an example of a recording head made by forming discharge openings of recording liquid in the recording head substrate made in this manner, and actually mounting an integrated circuit thereon. In this figure, the reference numeral 211 designates heat generating portions (heater portions), the reference numeral 402 denotes discharge opening, the reference numeral 403 designates an ink path wall forming liquid paths, the reference numeral 404 denotes a common liquid chamber, the reference numeral 405 designates a top plate, and the reference numeral 406 denotes ink supply ports.

The liquid jet recording head shown in FIG. 12 was subjected to an ink permeation test for a long period of time, but there occurred no corrosion of the electrodes 203 by the permeation of ink from the portion in which the hole 206 was created, i.e., the portion filled with the filler 208. Accordingly, it could be confirmed that the reliability of the recording head can be enhanced by filling the recess created in that portion of the support member in which the short-circuited wiring portion was cut by the laser beam as in the present embodiment with a filler such as an insulating material.

Figure 13:
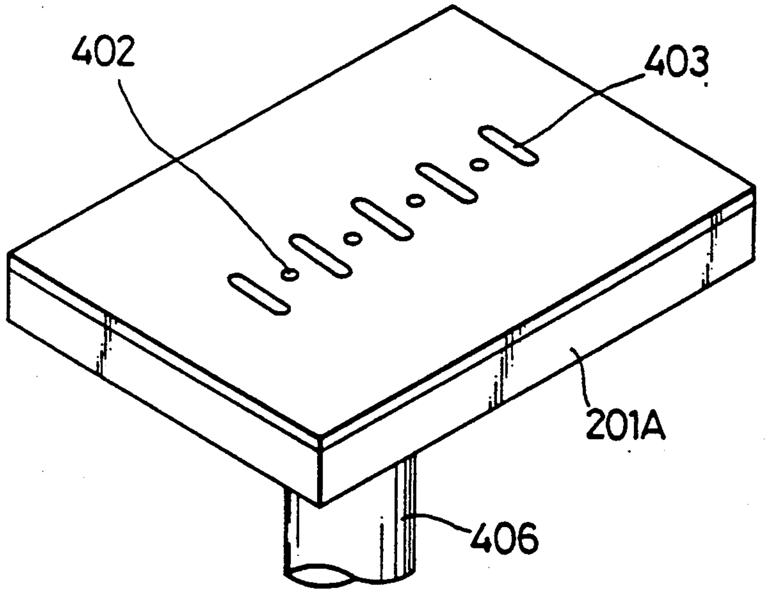
FIG. 13 is a perspective view of a recording head according to another embodiment of the present invention.

The filler embedded into the hole may preferably be an insulating material, because there is the possibility of short-circuiting being caused between the wirings if the filler is not an insulating material. However, in the above-described embodiment, the insulating material embedded into the recess is $SiO_2$, but of course, another insulating material may be used. That is, at least one kind selected from $SiO_2$, $Si_3N_4$, SiC, $Ta_2O_5$, $Al_2O_3$, AlN, BN, $B_2O_3$, BeO, TiN, $TiO_2$ and $WO_3$ can be used as a preferred material Also, in all the above-described embodiments, as shown in FIG. 12, the direction of ink discharge is the plane of the surface of the heater portion 211, but the present invention is also applicable to a liquid jet recording head as shown in FIG. 13 wherein ink is discharged in a direction almost perpendicular to the surface of the heater portion 211.

As described above, according to the present invention, the recess formed in the support member of the substrate by cutting the short-circuited wiring portion by a laser beam or the like is filled with a filler and the great level difference of the recess is eliminated so that the covering property of the upper protective layer for protecting the wiring may be improved and therefore, the permeation of the recording liquid into the electrode wiring portion can be prevented and the wiring is not corroded with a result that disconnection does not occur and the long-term reliability of the recording head can be improved.

Figure 14:
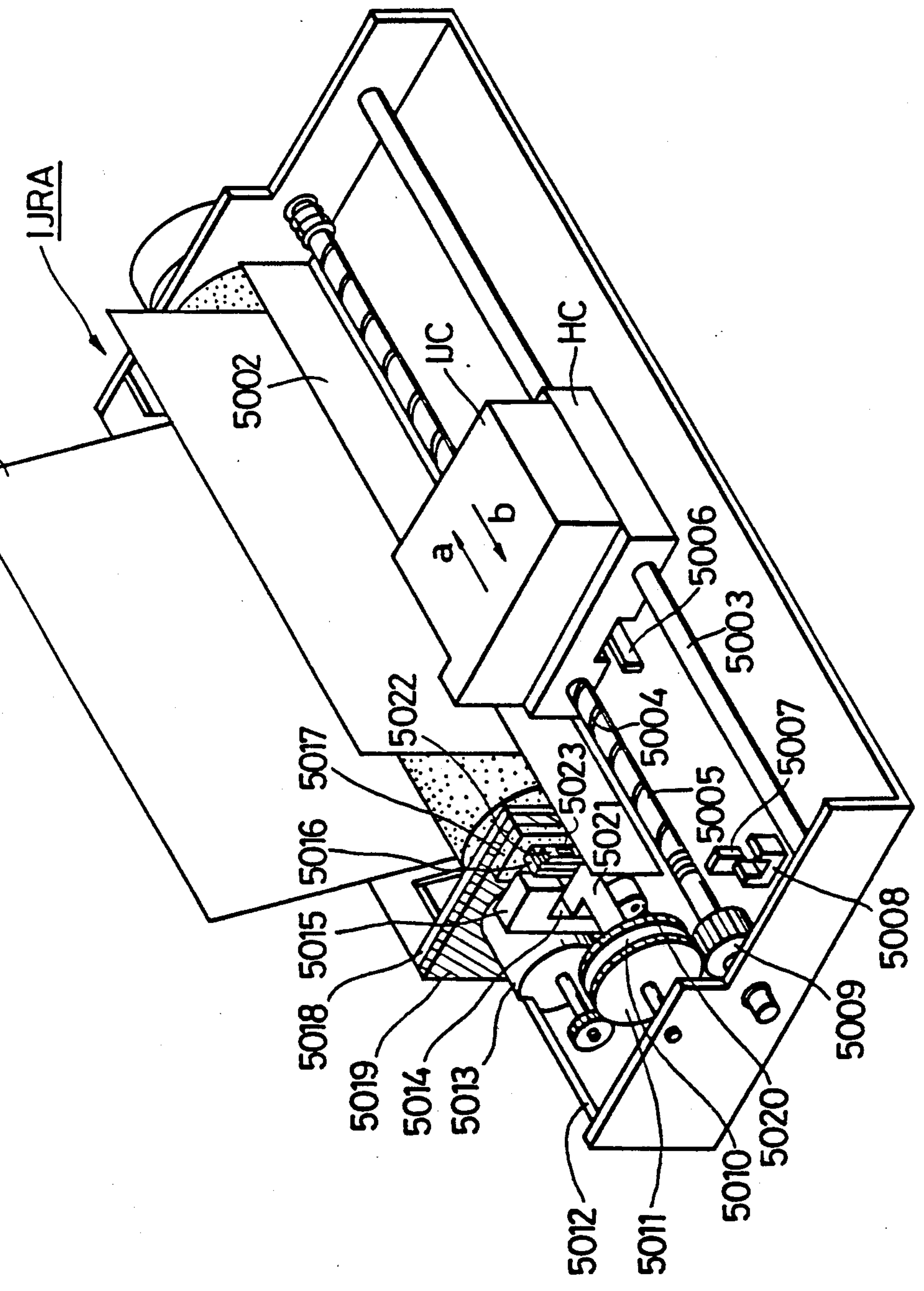
FIG. 14 is a schematic perspective view showing an example of the ink jet recording apparatus to which the present invention is applied.

FIG. 14 is a schematic perspective view showing an example of the ink jet recording apparatus IJRA to which the present invention is applied. A carriage HC which engages with a spiral groove 5004 of a lead screw 5005 being rotatable through driving force transmitting gears 5011, 5009 in conjunction with the reciprocal rotation of a drive motor 5013 has a pin (not shown) and is reciprocated in the directions of arrows a, b. Paper holding plate 5002 presses paper against a platen 5000 throughout the range of the movement of the carriage. Photocouplers 5007, 5008 are used as home position detecting means for detecting the presence of the lever 5006 of the carriage in the predetermined area to, switch the direction of rotation of the motor 5013. Member 5016 holds a capping member 5022 for capping the front surface of a cartridge recording head IJC integrally provided with an ink tank. Suction means 5015, for suction of the inside of the cap, effects suction recovery of the head through a opening 5023 in the cap. Cleaning blade 5017 and member 5019 for moving the blade forward and backward, are both supported on a mainbody supporting member 5018. The shape of the blade is not limited to that shown in the figure, and any one of well known blades may be employed for this example. lever 5012, for starting suction for suction recovery, moves in conjunction with the movement of a cam 5020 engaged with the carriage, whereby the driving force of the drive motor is transmitted by a conventional transmitting means such as clutch transfer and the like to be utilized for control.

The present invention brings about excellent effects particularly in a recording head, recording device of the bubble jet system among the ink jet recording system.

As to its representative constitution and principle, for example, one practiced by use of the basic principle disclosed in, for example, U.S. Pat. Nos. 4,723,129 and 4,740,796 is preferred. This system is applicable to either of the so called on-demand type and the continuous type. Particularly, the case of the on-demand type is effective because, by applying at least one driving signal which gives rapid temperature elevation exceeding nucleus boiling corresponding to the recording information on an electricity-heat convertors arranged corresponding to the sheets or liquid channels holding liquid (ink), heat energy is generated at the electricity-heat converters to effect film boiling at the heat acting surface of the recording head, and consequently the bubbles within the liquid (ink) can be formed corresponding one by one to the driving signals. By discharging the liquid (ink) through an opening for discharging by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in response characteristic. As the driving signals of such pulse shape, those as disclosed in U.S. Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination constitutions of the discharging orifice, liquid channel, electricityheat converter (linear liquid channel or right angle liquid channel) as disclosed in the above-mentioned respective specifications, the constitution by use of U.S. Pat. No. 4,558,333, 4,459,600 disclosing the constitution having the heat acting portion arranged in the flexed region is also included in the present invention. In addition, the present invention can be also effectively made according to the constitution as disclosed in Japanese Patent Laid-Open Application No. 59-123670 which discloses the constitution using a slit common to a plurality of electricity-heat converters as the discharging portion of the electricity-heat converter or Japanese Patent laid-Open Application No. 59-138461 which discloses the constitution having the opening for absorbing pressure waves of heat energy corresponding to the discharging portion.

Further, as the recording head of the full line type having a length corresponding to the maximum width of recording medium which can be recorded by the recording device, either the constitution which satisfies its length by combination of a plurality of recording heads as disclosed in the above-mentioned specifications or the constitution as one recording head integrally formed may be used, and the present invention can exhibit the effects as described above further effectively.

In addition, the present invention is effective for a recording head of the freely exchangeable chip type which enables electrical connection to the main device or supply of ink from the main device by being mounted on the main device, or for the case by use of a recording head of the cartridge type provided integrally on the recording head itself.

Also, the addition of a restoration means for the recording head, a preliminary auxiliary means, etc. provided as the constitution of the recording device of the present invention is preferable, because the effect of the present invention can be further stabilized. Specific examples of these may include, for the recording head, capping means, cleaning means, pressurization or aspiration means, electricity-heat converters or another heating element or preliminary heating means according to a combination of these. It is also effective for performing stable recording to include a preliminary mode which performs discharging separate from recording.

Further, as the recording mode of the recording device, the present invention is extremely effective for not only the recording mode only using a primary stream color such as black etc., but also a device equipped with at least one of plural different colors or full color by color mixing, whether the recording head may be either integrally constituted or combined in plural number.

In the examples of the present invention as set forth above, the use of liquid ink is discussed, but any ink which is solid or softened at room temperature may also be used in the present invention. In the ink jet recording apparatus as described above it is a common practice to control the temperature of ink itself within a range of 30° to 70° C., thus adjusting the viscosity of the ink to be within the stable ejection range. Accordingly any ink which is liquid upon applying a recording signal may be used. Furthermore, any ink which is liquefied upon application of thermal energy may also be used in the present invention. Such types of inks include, for example, one which upon application of thermal energy depending on recording signal, is liquefied to be ejected in the form of ink droplet and one which is being solidified at the time it arrives at a recording medium. Such types of inks are used for the purpose of, for example, positively utilizing thermal energy as the energy for phase change of ink from solid to liquid to prevent temperature elevation due to thermal energy or using an ink which is solidified when left to stand to prevent evaporation of ink. When such an ink is to be used, the ink may be held in the form of liquid or solid in recessed portions or through holes of a porous sheet while facing the electro-thermal transducer as shown in, for example, Japanese Laid-Open Patent Application Nos. 54-56847 and 60-71260. In the present invention, the most useful system for use of the inks as described above is the system effecting film boiling as described above.

I claim:

1. A method of manufacturing a substrate for a liquid jet recording head provided with a support member and an electro-thermal transducer provided on the support member, the electro-thermal transducer having a heat generating resistance layer and electrodes connected to the heat generating resistance layer, said method comprising the steps of:

cutting a short-circuited wiring portion of the electrodes;

embedding a filler into a recess created in the support member in said cutting step; and providing a protective layer on the embedded filter and the electrodes.

2. A method according to claim 1, wherein an insulating material is used as the filler.

3. A method according to claim 1, wherein a laser beam is utilized in said cutting step.

4. A method of manufacturing an ink jet recording head, the head including a substrate and a member having a recessed portion for forming an ink path by bonding the member to the substrate, the substrate having a support member and an electro-thermal transducer provided on the support member, the electro-thermal transducer having a heat generating resistance layer and electrodes connected to said heat generating resistance layer, said method comprising the steps of:

cutting a short-circuited wiring portion of the electrodes;

embedding a filler into a recess created in the support member in said cutting step; and providing a protective layer on the embedded filler and the electrodes.

5. A method according to claim 4, wherein an insulating material is used as the filler.

6. A method according to claim 4, wherein a laser beam is utilized in said cutting step.

7. An ink jet recording head including:

a substrate; and a member having a recessed portion forming an ink path by bonding said member to said substrate, wherein said substrate has a support member and an electro-thermal transducer provided on said support member, said electrothermal transducer having a heat generating resistance layer and electrodes connected to said heat generating resistance layer, said substrate having a filler embedded in a recess over which a protective layer is provided, and wherein said recording said is manufactured by the steps of:

cutting a short-circuited wiring portion of said electrodes;

embedding the filler into the recess created in said support member in said cutting step;

providing the protective layer on the embedded filler and said electrodes; and attaching said substrate to said member having the recessed portion.

8. An ink jet recording head according to claim 7, wherein an insulating material is used as the filler.

9. An ink jet recording head according to claim 7, wherein the cutting step is effected by the use of a laser beam.

10. An ink jet recording apparatus comprising:

an ink jet recording head including a substrate, and a member having a recessed portion for forming an ink path by bonding said member to said substrate, wherein said substrate has a support member and an electro-thermal transducer provided on said support member, said electrothermal provided on said support member, said electrothermal transducer having a heat generating resistance layer and electrodes connected to said heat generating resistance layer, said substrate having a filler embedded in a recess over which a protective layer is provided; and conveying means for conveying a recording medium for recording by the ink jet recording head, wherein said recording apparatus is manufactured by the steps of:

cutting a short-circuited wiring portion of said electrodes;

embedding the filler into the recess created in said support member in said cutting step;

providing the protective layer on the embedded filler and said electrodes;

attaching said substrate to said member having a recessed portion; and positioning said recording head adjacent said conveying means.

11. A substrate for a liquid jet recording head provided with a support member and an electro-thermal transducer provided on the support member, the electrothermal transducer having a heat generating resistance layer and electrodes connected to the heat generating resistance layer, said substrate having a filler embedded in a recess over which a protective layer is provided, wherein said substrate is manufactured by the steps of:

cutting a short-circuited wiring portion of the electrodes;

embedding the filler into the reccss created in the support member in said cutting step; and providing a protective layer on the embedded filler and the electrodes.

12. A substrate according to claim 11, wherein an insulating material is used as the filler.

13. A substrate according to claim 11, wherein the cutting step is effected by the use of a laser beam.

* * * * *

UNITED STATES PATENT AND TRADEMARK OFFICE

CERTIFICATE OF CORRECTION

PATENT NO. : 5,211,754

DATED : May 18, 1993

INVENTOR(S) : Hirokazu KOMURO

It is certified that error appears in the above-indentified patent and that said Letters Patent is hereby corrected as shown below:

COLUMN 1:

Line 12, "5,140,343," should read --5,140,345--;

Line 63, "accomplished" should read --accomplished.--.

COLUMN 2:

Line 26, "drawings" should read --drawings.--;

Line 60, "layers" should read --layers.--.

COLUMN 3:

Line 33, "However" should read --However,--.

COLUMN 6:

Line 14, "technique" should read --technique.--.

UNITED STATES PATENT AND TRADEMARK OFFICE

CERTIFICATE OF CORRECTION

PATENT NO. : 5,211,754

DATED : May 18, 1993

INVENTOR(S) : Hirokazu KOMURO

It is certified that error appears in the above-indentified patent and that said Letters Patent is hereby corrected as shown below:

COLUMN 8:

Line 8, "20 nS." should read --20 nS,--.

COLUMN 9:

Line 3, "material" should read --material.--;

Line 34, "to," should read --to--;

Line 46, "lever" should read --Lever--.

COLUMN 10:

Line 18, "electricityheat" should read --electricity-heat--.

COLUMN 11:

Line 44, "filter" should read --filler--.

UNITED STATES PATENT AND TRADEMARK OFFICE

CERTIFICATE OF CORRECTION

PATENT NO. : 5,211,754 Page 3 of 3

DATED : May 18, 1993

INVENTOR(S) : Hirokazu KOMURO

It is certified that error appears in the above-indentified patent and that said Letters Patent is hereby corrected as shown below:

COLUMN 12:

Line 10, "said" (second occurrence) should read --head--;

Line 31, "provided on" should be deleted;

Line 32, "said support member, said electrothermal" should be deleted.

Signed and Sealed this

Nineteenth Day of July, 1994

Attest:

BRUCE LEHMAN

Attesting Officer

Commissioner of Patents and Trademarks